(12) United States Patent
Kaneyoshi et al.

(10) Patent No.: US 8,974,696 B2
(45) Date of Patent: Mar. 10, 2015

(54) PREPARATION OF COMPLEX FLUORIDE AND COMPLEX FLUORIDE PHOSPHOR

(75) Inventors: Masami Kaneyoshi, Echizen (JP); Yasushi Takai, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 175 days.

(21) Appl. No.: 13/439,108

(22) Filed: Apr. 4, 2012

(65) Prior Publication Data

US 2012/0256125 A1    Oct. 11, 2012

(30) Foreign Application Priority Data

Apr. 8, 2011  (JP) ................. 2011-086353

(51) Int. Cl.
| | | |
|---|---|---|
| *C01B 9/08* | (2006.01) | |
| *C09K 11/08* | (2006.01) | |
| *C09K 11/61* | (2006.01) | |
| *C01G 17/00* | (2006.01) | |
| *C01G 19/00* | (2006.01) | |
| *C01G 23/00* | (2006.01) | |
| *C01G 25/00* | (2006.01) | |
| *C01G 27/00* | (2006.01) | |

(52) U.S. Cl.
CPC ............... *C09K 11/617* (2013.01); *C01B 9/08* (2013.01); *C01G 17/00* (2013.01); *C01G 17/006* (2013.01); *C01G 19/00* (2013.01); *C01G 19/006* (2013.01); *C01G 23/00* (2013.01); *C01G 23/002* (2013.01); *C01G 25/00* (2013.01); *C01G 25/006* (2013.01); *C01G 27/00* (2013.01); *C01G 27/006* (2013.01); *C01P 2002/84* (2013.01); *C01P 2004/03* (2013.01); *C01P 2004/61* (2013.01); *C01P 2004/62* (2013.01)
USPC ............... 252/301.4 H; 423/464; 423/472

(58) Field of Classification Search
CPC .. C09K 11/675; C09K 11/667; C09K 11/617; C09K 11/616; C01B 9/08; C01B 33/10; C01G 17/006; C01G 19/006; C01G 23/002; C01G 25/006; C01G 27/006
USPC ............... 423/464, 472; 252/301.4 H
See application file for complete search history.

(56) References Cited

U.S. PATENT DOCUMENTS

| | | | |
|---|---|---|---|
| 3,576,756 A | | 4/1971 | Russo |
| 4,105,469 A | * | 8/1978 | Megy et al. ............... 134/3 |
| 4,330,342 A | * | 5/1982 | Fennemann et al. ............ 134/13 |
| 4,407,783 A | * | 10/1983 | Ulmer et al. ............... 423/347 |
| 7,497,973 B2 | | 3/2009 | Radkov et al. |
| 2010/0091215 A1 | | 4/2010 | Fukunaga et al. |
| 2010/0142189 A1 | | 6/2010 | Hong et al. |

FOREIGN PATENT DOCUMENTS

| | | | |
|---|---|---|---|
| DE | 3228177 | * | 2/1984 |
| JP | 5-306115 A | | 11/1993 |
| JP | 2000-302434 | * | 10/2000 |
| JP | 2010-209331 A | | 9/2010 |
| WO | 2007/100824 A2 | | 9/2007 |
| WO | 2009/119486 A1 | | 10/2009 |

OTHER PUBLICATIONS

Kyoritsu Shuppan Co., "Encyclopaedia chimica", vol. 8, p. 278, 1964.
Maruzene Co., "Synthesis of Inorganic Compound III", New Experimental Chemistry Series #8, p. 1166, 1977.
Extended European Search Report dated Nov. 20, 2013, issued in corresponding European Patent Application No. 12162447.2 (5 pages).
A.G. Paulusz, "Efficient Mn(IV) Emission in Fluorine Coordination", Journal of the Electrochemical Society, vol. 120, No. 7, pp. 942-947, Jul. 1973.
Notification of Submission of Publication, dated Sep. 22, 2014 and issued in Japanese Patent Application No. 2012/073305 (w/English translation) (2 pages).
Submission of Publication, dated Aug. 29, 2014 and issued in Japanese Patent Application No. 2012/073305 (w/English translation) (12 pages).

* cited by examiner

*Primary Examiner* — Carol M Koslow
(74) *Attorney, Agent, or Firm* — Westerman, Hattori, Daniels & Adrian, LLP

(57) ABSTRACT

A complex fluoride $A_2MF_6$ wherein M is a tetravalent element Si, Ti, Zr, Hf, Ge or Sn, A is an alkali metal Li, Na, K, Rb or Cs is prepared by providing a first solution containing a fluoride of M, providing a second solution containing a compound of A and/or the compound of A in solid form, mixing the first solution with the second solution and/or the solid for reacting the fluoride of M with the compound of A, and recovering the resulting solid product via solid-liquid separation.

11 Claims, 8 Drawing Sheets

PREPARATION OF COMPLEX FLUORIDE AND COMPLEX FLUORIDE PHOSPHOR

CROSS-REFERENCE TO RELATED APPLICATION

This non-provisional application claims priority under 35 U.S.C. §119(a) on Patent Application No. 2011-086353 filed in Japan on Apr. 8, 2011, the entire contents of which are hereby incorporated by reference.

TECHNICAL FIELD

This invention relates to a method for preparing a complex fluoride in a safe and efficient manner, and a method of preparing a complex fluoride phosphor having improved emissive properties.

BACKGROUND ART

To add red tone to the light emission of white LED to impart warmness to the emission color, a phosphor capable of red emission upon excitation with near-UV to blue light of LED is required. While many research works have been made thereon, WO 2007/100824 describes a complex fluoride of the formula $A_2MF_6$ which is doped with Mn wherein A is Na, K, Rb or the like, and M is Si, Ge, Ti or the like.

The preparation method described therein is by dissolving or dispersing raw materials in hydrofluoric acid and heating for evaporating to dryness. Since the solution containing a high concentration of hydrofluoric acid must be heated at high temperature, a substantial amount of hydrogen fluoride which is harmful to the human body volatilizes off. The method is thus quite difficult to implement in the industry. Besides the phosphor thus obtained is insufficient in purity, particle shape, and emission properties, leaving a room for improvement.

WO 2009/119486 discloses a method of preparing a phosphor by mixing a single metal such as silicon with a mixed solution of hydrofluoric acid and potassium permanganate. The method has a low reaction rate and hence, a low productivity, so it is less viable in the industry.

It is known from JP-A H05-306115 that particulate mica with a high purity and uniform size can be prepared using potassium hexafluorosilicate ($K_2SiF_6$) as the raw material. Potassium hexafluorosilicate is, in turn, prepared by adding potassium chloride to hexafluorosilicic acid aqueous solution, as described in Encyclopaedia Chimica, Kyoritsu Shuppan Co., Vol. 8, p278, 1964.

However, this method is unsuccessfully applied to phosphor preparation. When manganese is added to the reaction solution, an undesirable change probably attributable to a valence change of Mn ion occurs. The reaction product has no emissive properties and is not useful as phosphor.

CITATION LIST

Patent Document 1: WO 2007/100824
Patent Document 2: WO 2009/119486
Patent Document 3: JP-A H05-306115
Non-Patent Document 1: Encyclopaedia Chimica, Kyoritsu Shuppan Co., Vol. 8, p278, 1964
Non-Patent Document 2: New Experimental Chemistry Series #8, "Synthesis of Inorganic Compound III", Maruzen Co., p1166, 1977

SUMMARY OF INVENTION

An object of the invention is to provide a method for preparing a complex fluoride, especially a complex fluoride phosphor having satisfactory emissive properties, in safety and at high productivity.

The inventor has found that a complex fluoride having the formula (1):

$$A_2MF_6 \tag{1}$$

wherein M is one or more tetravalent elements selected from Si, Ti, Zr, Hf, Ge, and Sn, and A is one or more alkali metals selected from Li, Na, K, Rb, and Cs, can be prepared by mixing a first solution containing a fluoride of tetravalent element M with a second solution containing a compound of alkali metal A and/or the compound of alkali metal A in solid form, the compound of alkali metal A being selected from a fluoride, hydrogenfluoride, nitrate, sulfate, hydrogensulfate, carbonate, hydrogencarbonate, and hydroxide, for thereby reacting the fluoride of tetravalent element M with the compound of alkali metal A.

The inventor has also found that a complex fluoride phosphor having the formula (2):

$$A^1{}_2MF_6{:}Mn \tag{2}$$

wherein M is as defined above, $A^1$ is one, two or more alkali metals selected from Li, Na, K, Rb, and Cs, and invariably contains Na and/or K, can be prepared by adding a manganese compound $Na_2MnF_6$ or $K_2MnF_6$ to either one or both of the first solution and the second solution and/or the solid, and mixing the first solution with the second solution and/or the solid for reaction.

In either method, the reaction product precipitates in the reaction solution as solid, and it may be recovered by solid-liquid separation. The reaction may be performed at a relatively low temperature, e.g., 0° C. to 100° C. Thus the complex fluoride and complex fluoride phosphor can be prepared in safety and at a high productivity. In particular, the latter method is successful in preparing a complex fluoride phosphor having a uniform particle size, conformable particle shape and satisfactory emissive properties.

In one aspect, the invention provides a method for preparing a complex fluoride having the formula (1):

$$A_2MF_6 \tag{1}$$

wherein M is one or more tetravalent elements selected from the group consisting of Si, Ti, Zr, Hf, Ge, and Sn, A is one or more alkali metals selected from the group consisting of Li, Na, K, Rb, and Cs, the method including the steps of:

providing a first solution containing a fluoride of tetravalent element M, providing a second solution containing a compound of alkali metal A and/or the compound of alkali metal A in solid form, the compound of alkali metal A being selected from the group consisting of a fluoride, hydrogenfluoride, nitrate, sulfate, hydrogensulfate, carbonate, hydrogencarbonate, and hydroxide, mixing the first solution with the second solution and/or the solid for reacting the fluoride of tetravalent element M with the compound of alkali metal A to form a solid product, and recovering the solid product via solid-liquid separation.

Typically, the tetravalent element M is Si and/or Ti, and the alkali metal A is Na and/or K.

In another aspect, the invention provides a method for preparing a complex fluoride phosphor having the formula (2):

$$A^1{}_2MF_6{:}Mn \tag{2}$$

wherein M is one or more tetravalent elements selected from the group consisting of Si, Ti, Zr, Hf, Ge, and Sn, $A^1$ is one, two or more alkali metals selected from the group consisting of Li, Na, K, Rb, and Cs, and invariably contains Na and/or K, the method including the steps of:

providing a first solution containing a fluoride of tetravalent element M, providing a second solution containing a compound of alkali metal A and/or the compound of alkali metal A in solid form, wherein A is one or more alkali metals selected from the group consisting of Li, Na, K, Rb, and Cs, the compound of alkali metal A being selected from the group consisting of a fluoride, hydrogenfluoride, nitrate, sulfate, hydrogensulfate, carbonate, hydrogencarbonate, and hydroxide, adding at least one of manganese compounds, $Na_2MnF_6$ and $K_2MnF_6$ to at least one of the first solution and the second solution and/or the solid, mixing the first solution with the second solution and/or the solid for reacting the fluoride of tetravalent element M with the compound of alkali metal A and the manganese compound to form a solid product, and recovering the solid product via solid-liquid separation.

Typically, the tetravalent element M is Si and/or Ti, and the alkali metal A is Na and/or K. Preferably, the second solution and the solid are a solution containing an alkali fluoride AF and the alkali fluoride AF in solid form, respectively, wherein A is as defined above.

ADVANTAGEOUS EFFECTS OF INVENTION

According to the methods of the invention, a complex fluoride and complex fluoride phosphor can be prepared by mixing solutions to form a solid reaction product at a relatively low temperature, e.g., 0° C. to 100° C. and subsequent solid-liquid separation. The methods give rise to no safety or hygiene problem and have a high productivity. The phosphor is available in particle form with a uniform size and conformable shape and has satisfactory emissive properties.

DESCRIPTION OF EMBODIMENTS

Figure 1:
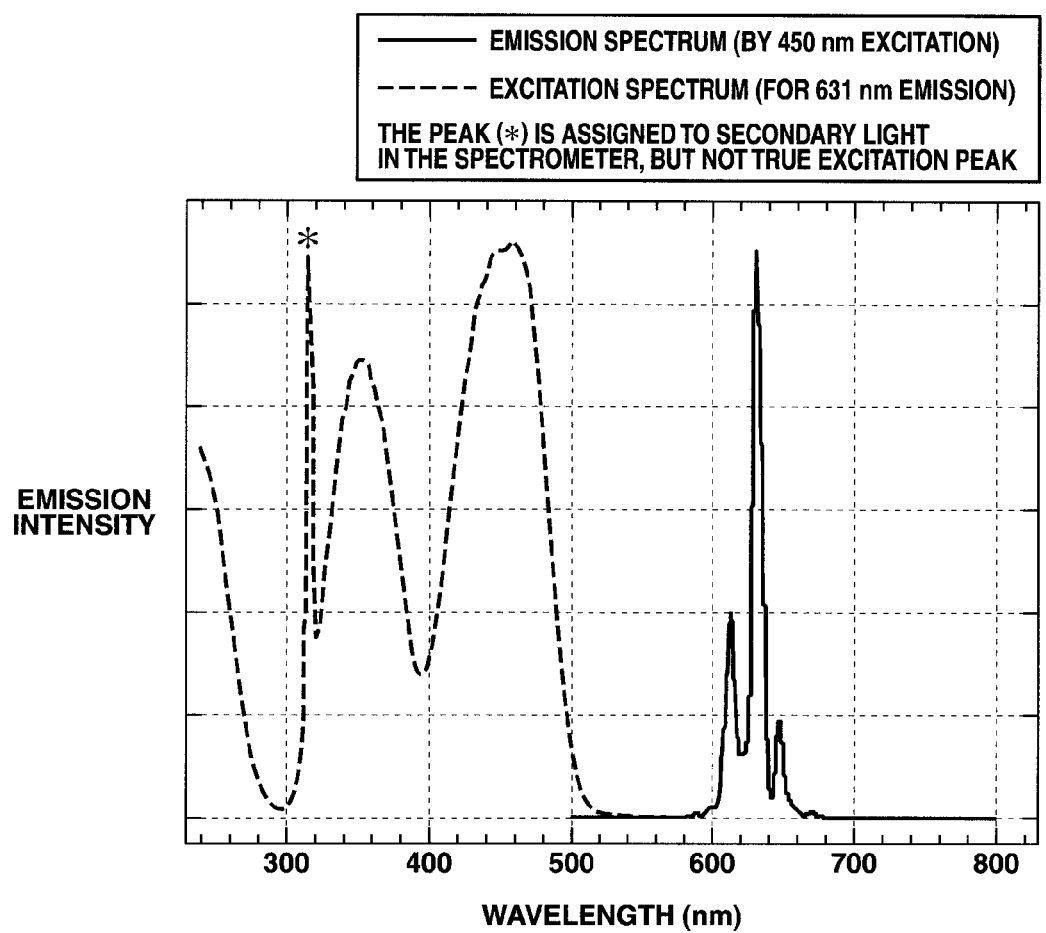
FIG. 1 diagrammatically illustrates emission and excitation spectra of the phosphor obtained in Example 1.

One embodiment of the invention is a method for preparing a complex fluoride having the formula (1):

$$A_2MF_6 \qquad (1)$$

wherein F is fluorine; M is one or more tetravalent elements selected from Si, Ti, Zr, Hf, Ge, and Sn, preferably Si and/or Ti; and A is one or more alkali metals selected from Li, Na, K, Rb, and Cs, preferably Na and/or K.

Another embodiment of the invention is a method for preparing a complex fluoride phosphor having the formula (2):

$$A^1{}_2MF_6{:}Mn \qquad (2)$$

wherein M is one or more tetravalent elements selected from Si, Ti, Zr, Hf, Ge, and Sn, preferably Si and/or Ti; $A^1$ is one, two or more alkali metals selected from Li, Na, K, Rb, and Cs, and invariably contains Na and/or K, preferably $A^1$ is Na and/or K. The phosphor has a structure in which one or more constituent of the complex fluoride $A^1{}_2MF_6$ is, in part, replaced by Mn. Since such phosphor is generally referred to as "Mn-activated phosphor," the present phosphor may be referred to as Mn-activated complex fluoride phosphor.

In the Mn-activated complex fluoride phosphor having formula (2), preferably the activator Mn is a replacement at the site of tetravalent element M in the complex fluoride $A^1{}_2MF_6$, as tetravalent manganese ($Mn^{4+}$), though the replacement site is not limited thereto. That is, the phosphor containing tetravalent manganese ($Mn^{4+}$) is preferable, which is generally represented as $A^1{}_2MF_6{:}Mn^{4+}$.

The complex fluoride phosphor absorbs well radiation in the wavelength range from ultraviolet (UV) to blue light, for example, radiation in the range of 250 nm to 500 nm. Specifically, when the phosphor is excited with UV radiation of 320 to 390 nm wavelength, preferably near-UV radiation of 360 to 390 nm wavelength, purple light of 390 to 420 nm wavelength, or blue light of 420 to 490 nm wavelength, it emits red light having an emission peak, especially maximum emission peak, in the wavelength range of 660 to 710 nm.

Now the methods of preparing a complex fluoride and complex fluoride phosphor are described in detail.

In one embodiment, a complex fluoride having formula (1) is prepared by providing a first solution containing a fluoride of tetravalent element M (wherein M is one or more tetravalent element selected from Si, Ti, Zr, Hf, Ge, and Sn, preferably Si and/or Ti), and providing a second solution containing a compound of alkali metal A and/or the compound of alkali metal A in solid form (wherein A is one or more alkali metals selected from Li, Na, K, Rb, and Cs, preferably Na and/or K), the compound of alkali metal A being selected from a fluoride, hydrogenfluoride, nitrate, sulfate, hydrogensulfate, carbonate, hydrogencarbonate, and hydroxide.

The first solution is generally available as aqueous solution. Typically, the first solution may be prepared by dissolving a fluoride of tetravalent element M in water, optionally along with hydrogen fluoride (hydrofluoric acid aqueous solution). Alternatively, an oxide, hydroxide or carbonate of tetravalent element M may be dissolved in water along with hydrogen fluoride (hydrofluoric acid aqueous solution) to prepare the first solution. This solution is substantially an aqueous solution containing the fluoride or polyfluoroacid salt (e.g., hexafluorosilicate) of tetravalent element M.

In the first solution, the concentration of the fluoride of tetravalent element M is preferably 0.1 to 3 mole/liter, more preferably 0.2 to 1.5 mole/liter. The concentration of hydrogen fluoride (hydrofluoric acid aqueous solution) is preferably 0 to 30 mole/liter, more preferably 0.1 to 27 mole/liter. Also preferably hydrogen fluoride is added in such amounts that a molar ratio of fluorine to tetravalent element M may be at least 6/1, more preferably at least 8/1. The upper limit of molar ratio of fluorine to tetravalent element M is typically up to 100/1, though not critical. During preparation of the first solution, it may be cooled or heated at a temperature of, e.g., 0° C. to 100° C., preferably 20 to 80° C., if necessary.

The second solution may be prepared as aqueous solution by dissolving a compound of alkali metal A in water, optionally along with hydrogen fluoride (hydrofluoric acid aqueous solution). Herein A is one or more alkali metals selected from Li, Na, K, Rb, and Cs, preferably Na and/or K, and the compound of alkali metal A is selected from a fluoride AF, hydrogenfluoride $AHF_2$, nitrate $ANO_3$, sulfate $A_2SO_4$, hydrogensulfate $AHSO_4$, carbonate $A_2CO_3$, hydrogencarbonate $AHCO_3$, and hydroxide AOH. When a solid is used as the reactant instead of the second solution, the compound of alkali metal A selected from fluoride AF, hydrogenfluoride $AHF_2$, nitrate $ANO_3$, sulfate $A_2SO_4$, hydrogensulfate $AHSO_4$, carbonate $A_2CO_3$, hydrogencarbonate $AHCO_3$, and hydroxide AOH may be provided as solid.

In the second solution, the concentration of the compound of alkali metal A is preferably at least 0.02 mole/liter, more preferably at least 0.05 mole/liter as alkali metal A. The upper limit of concentration of alkali metal A is preferably up to 10 mole/liter, though not critical. During preparation of the second solution, it may be heated at a temperature of room temperature (e.g., 20° C.) to 100° C., preferably 20 to 80° C., if necessary.

Next the first solution is mixed with the second solution and/or the solid whereupon the fluoride of tetravalent element M reacts with the compound of alkali metal A. They are mixed in such amounts that the alkali metal A in the second solution or solid and the tetravalent element M in the first solution are preferably in a molar ratio A/M of 2.0/1 to 10.0/1, more preferably 2.0/1 to 5.0/1. Also preferably they are carefully and gradually mixed because their mixing is sometimes exothermic. The reaction temperature is typically −20° C. to 100° C., preferably 0° C. to 80° C. The reaction time is typically 10 seconds to 1 hour. Once the first solution is mixed with the second solution and/or the solid, reaction takes place to form a solid product which will precipitate. In this regard, the first solution is mixed with the second solution and/or the solid in such amounts that the solution at the end of reaction may contain the solid product in a concentration of 1 to 20% by weight as solids.

The reaction solution is subjected to solid-liquid separation, for example, filtration, centrifugation or decantation. The solid product thus recovered is the desired complex fluoride. The reaction solution need not be concentrated prior to solid-liquid separation. It is noted that the solid product recovered by solid-liquid separation may be post-treated such as by washing or solvent exchange, and dried such as by vacuum drying, if necessary.

In the other embodiment, the complex fluoride phosphor having formula (2) is prepared by adding at least one (either one or both) of manganese compounds, $Na_2MnF_6$ and $K_2MnF_6$ to at least one (either one or both) of the first solution and the second solution and/or the solid, which are as provided in the one embodiment for the preparation of complex fluoride having formula (1). In formula (2), $A^1$ is one, two or more alkali metals selected from Li, Na, K, Rb, and Cs, and invariably contains Na and/or K. Differently stated, Na and/or K is essential among alkali metals represented by $A^1$.

The manganese compound is added in such an amount that tetravalent element M and Mn are preferably present in the combined raw materials (that is, the first solution and the second solution and/or the solid combined) in a range: 70 mol %≤M<100 mol %, more preferably 85 mol %≤M≤99.9 mol %, and 0 mol %<Mn≤30 mol %, more preferably 0.1 mol %≤Mn≤15 mol %, and even more preferably 0.5 mol %≤Mn≤10 mol %, provided that M+Mn=100 mol %. This proportion of M and Mn in the raw materials is correlated to the proportion of M and Mn in the resulting complex fluoride phosphor.

Further, the tetravalent element M in the first solution, Mn in the manganese compound added, and the alkali metal A in the second solution and/or solid are preferably in a molar ratio A/(M+Mn) of 2.0 to 10.0, more preferably 2.0 to 5.0.

Next the first solution is mixed with the second solution and/or the solid whereupon the fluoride of tetravalent element M reacts with the compound of alkali metal A and the manganese compound. Preferably they are carefully and gradually mixed because their mixing is sometimes exothermic. The reaction temperature is typically −20° C. to 100° C., preferably 0° C. to 80° C. The reaction time is typically 10 seconds to 1 hour. Once the first solution is mixed with the second solution and/or the solid, reaction takes place to form a solid product which will precipitate. In this regard, the first solution is mixed with the second solution and/or the solid in such amounts that the solution at the end of reaction may contain the solid product in a concentration of 1 to 20% by weight as solids.

The reaction solution is subjected to solid-liquid separation, for example, filtration, centrifugation or decantation. The solid product thus recovered is the desired complex fluoride phosphor. The reaction solution need not be concentrated prior to solid-liquid separation. It is noted that the solid product recovered by solid-liquid separation may be post-treated such as by washing or solvent exchange, and dried such as by vacuum drying, if necessary.

EXAMPLE

Preparation Example, Examples and Comparative Examples are given below by way of illustration and not by way of limitation. The raw materials used herein are available from Wako Pure Chemical Industries, Ltd. as reagent grade chemicals.

Preparation Example 1

Preparation of $K_2MnF_6$

Potassium hexafluoromanganate ($K_2MnF_6$) was prepared in accordance with the procedure described in New Experimental Chemistry Series #8, "Synthesis of Inorganic Compound III", Maruzen Co., p1166, 1977.

A reaction vessel of vinyl chloride resin was divided into two compartments by a central partition of fluororesin ion exchange membrane. Platinum plates were set as anode and cathode in two compartments divided by the ion exchange membrane. A hydrofluoric acid aqueous solution having manganese(II) fluoride dissolved therein was fed to the anode side compartment and a hydrofluoric acid aqueous solution was fed to the cathode side compartment. A power supply was connected to the electrodes to carry out electrolysis at a voltage of 3 V and a current flow of 0.75 A. At the end of electrolysis, a hydrofluoric acid aqueous solution containing potassium fluoride at a saturation level was added in excess to the reaction solution in the anode side compartment. There formed a yellow solid product, which was filtered and recovered as $K_2MnF_6$.

Example 1

An aqueous solution of silicon fluoride was prepared by dissolving 4.8 g of silicon dioxide in 100 cm³ of 48 wt % hydrofluoric acid aqueous solution and allowing the solution to cool down to room temperature. The $K_2MnF_6$ powder (1.19 g) in Preparation Example 1 was added to the aqueous solution of silicon fluoride and dissolved therein by stirring, obtaining an aqueous solution containing silicon fluoride and $K_2MnF_6$ as a first solution. Separately, an aqueous solution of potassium fluoride as a second solution was prepared by dissolving 13.95 g of potassium fluoride in 40 cm³ of 48 wt % hydrofluoric acid aqueous solution and allowing the solution to cool down to room temperature. With stirring, the second solution was slowly added to the first solution over about 3 minutes. Stirring was continued for further about 10 minutes whereupon a pale orange solid precipitated. The solid product was filtered, washed with a small volume of 20 wt % hydrofluoric acid aqueous solution and then ethanol, and dried in vacuum, obtaining 15.64 g of the reaction product.

On powder x-ray diffractometry, the product was identified to have a crystalline structure corresponding to $K_2SiF_6$. The product displayed red fluorescence when excited with UV or blue light, demonstrating formation of a phosphor represented as $K_2SiF_6$:Mn.

Using a fluorophotometer FP6500 (JASCO Corp.), emission and excitation spectra of the phosphor were measured, with the results shown in FIG. 1. Using a quantum efficiency measuring system QE1100 (Otsuka Electronics Co., Ltd.), the phosphor was measured for absorptance and quantum efficiency at excitation wavelength 450 nm, finding an absorptance of 0.701, an internal quantum efficiency of 0.717 and an external quantum efficiency (=[absorptance]$_x$[internal quantum efficiency]) of 0.503. The results are also tabulated in Table 1.

Figure 2:
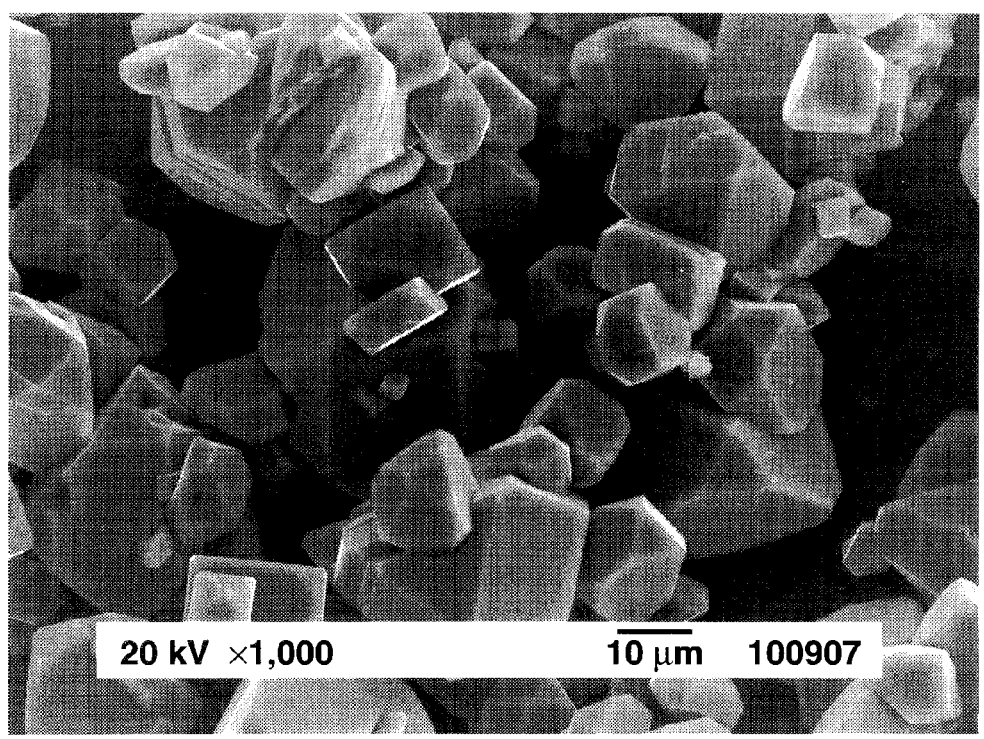
FIG. 2 is a SEM micrograph of the phosphor in Example 1.

The phosphor was observed under scanning electron microscope (SEM). It is seen from the SEM micrograph of FIG. 2 that the phosphor is composed mainly of angular particles having a relatively uniform size in the range of about 30 to 40 μm.

Example 2

An aqueous solution of silicon fluoride was prepared by dissolving 4.8 g of silicon dioxide in 100 cm$^3$ of 48 wt % hydrofluoric acid aqueous solution and allowing the solution to cool down to room temperature. The $K_2MnF_6$ powder (1.19 g) in Preparation Example 1 was added to the aqueous solution of silicon fluoride and dissolved therein by stirring, obtaining an aqueous solution containing silicon fluoride and $K_2MnF_6$ as a first solution. Separately, an aqueous solution of potassium fluoride as a second solution was prepared by dissolving 23.24 g of potassium fluoride in 25 cm$^3$ of water and allowing the solution to cool down to room temperature. With stirring, the second solution was slowly added to the first solution whereupon a pale orange solid precipitated. The solid product was filtered, washed with a small volume of 20 wt % hydrofluoric acid aqueous solution and then ethanol, and dried in vacuum, obtaining 16.79 g of the reaction product.

On powder x-ray diffractometry, the product was identified to have a crystalline structure corresponding to $K_2SiF_6$. The product displayed red fluorescence when excited with UV or blue light, demonstrating formation of a phosphor represented as $K_2SiF_6$:Mn.

As in Example 1, emission and excitation spectra of the phosphor were measured, obtaining the spectra equivalent to those of Example 1. As in Example 1, the phosphor was measured for absorptance and quantum efficiency at excitation wavelength 450 nm, finding an absorptance of 0.471, an internal quantum efficiency of 0.451 and an external quantum efficiency of 0.212. The results are also tabulated in Table 1.

Figure 3:
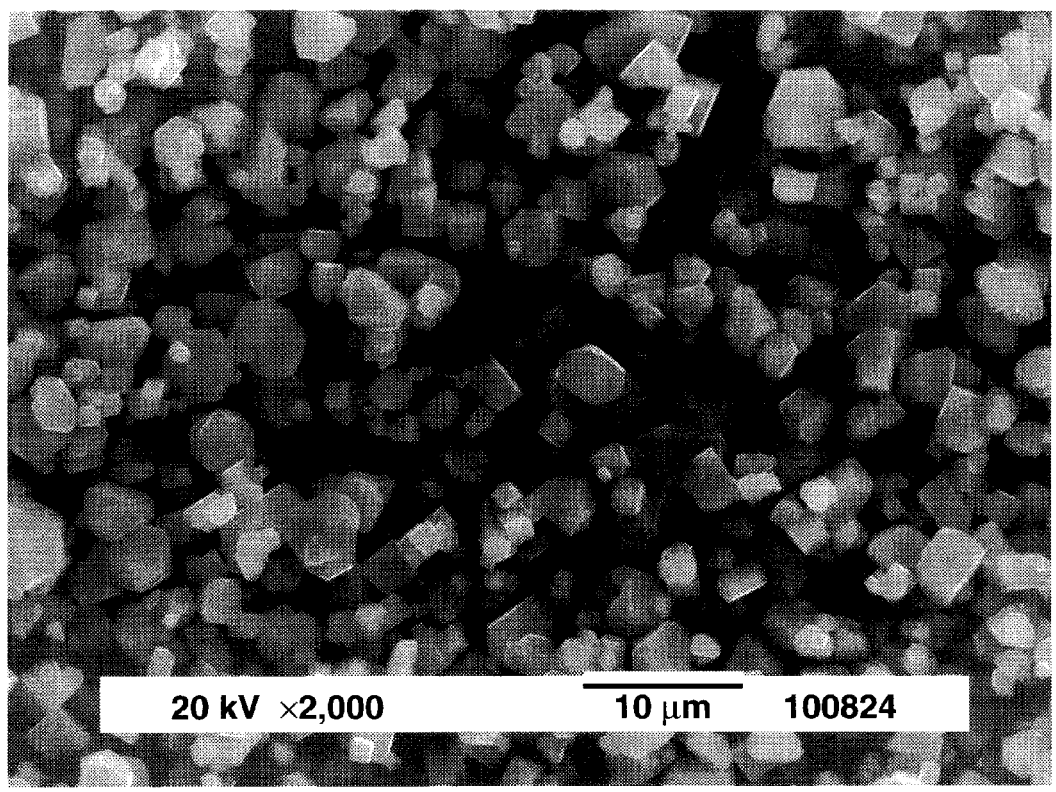
FIG. 3 is a SEM micrograph of the phosphor in Example 2.

The phosphor was observed under SEM. It is seen from the SEM micrograph of FIG. 3 that the phosphor is composed mainly of angular particles having a uniform size in the range of about 2 to 3 μm.

Example 3

An aqueous solution of silicon fluoride was prepared by dissolving 4.8 g of silicon dioxide in 100 cm$^3$ of 48 wt % hydrofluoric acid aqueous solution and allowing the solution to cool down to room temperature. The solution was placed in a lidded resin container and heated by keeping the container in a water bath at 70° C. for more than one hour. Then 1.19 g of the $K_2MnF_6$ powder in Preparation Example 1 was added to the aqueous solution of silicon fluoride and dissolved therein by stirring, obtaining an aqueous solution containing silicon fluoride and $K_2MnF_6$ as a first solution. Separately, an aqueous solution of potassium fluoride as a second solution was prepared by dissolving 13.95 g of potassium fluoride in 40 cm$^3$ of 48 wt % hydrofluoric acid aqueous solution and allowing the solution to cool down to room temperature. With stirring, the second solution was slowly added to the first solution over about 2.5 minutes. Stirring was continued for further about 10 minutes whereupon a pale orange solid precipitated. The solid product was filtered, washed with a small volume of 20 wt % hydrofluoric acid aqueous solution and then ethanol, and dried in vacuum, obtaining 15.18 g of the reaction product.

On powder x-ray diffractometry, the product was identified to have a crystalline structure corresponding to $K_2SiF_6$. The product displayed red fluorescence when excited with UV or blue light, demonstrating formation of a phosphor represented as $K_2SiF_6$:Mn.

As in Example 1, emission and excitation spectra of the phosphor were measured, obtaining the spectra equivalent to those of Example 1. As in Example 1, the phosphor was measured for absorptance and quantum efficiency at excitation wavelength 450 nm, finding an absorptance of 0.716, an internal quantum efficiency of 0.801 and an external quantum efficiency of 0.574. The results are also tabulated in Table 1.

A SEM image of the phosphor was observed. The phosphor was composed mainly of angular particles having a size of about 20 to 50 μm.

Example 4

An aqueous solution of titanium fluoride was prepared by feeding 6.39 g of titanium dioxide and 30 cm$^3$ of 48 wt % hydrofluoric acid aqueous solution in a closed container, heating the container at 95° C. for 18 hours, and allowing it to cool down. This aqueous solution was fully clear. To the aqueous solution of titanium fluoride, 10 cm$^3$ of 48 wt % hydrofluoric acid aqueous solution was added, and 1.19 g of the $K_2MnF_6$ powder in Preparation Example 1 was added. The contents were dissolved by stirring, obtaining an aqueous solution containing titanium fluoride and $K_2MnF_6$ as a first solution. Separately, an aqueous solution of potassium fluoride as a second solution was prepared by dissolving 13.95 g of potassium fluoride in 9 cm$^3$ of 48 wt % hydrofluoric acid aqueous solution and 40 cm$^3$ of water. With stirring, the second solution was slowly added to the first solution over about 1 minute. Stirring was continued for some time whereupon a pale orange solid precipitated. The solid product was filtered, washed with a small volume of 20 wt % hydrofluoric acid aqueous solution and then ethanol, and dried in vacuum, obtaining 17.04 g of the reaction product.

On powder x-ray diffractometry, the product was identified to have a crystalline structure corresponding to $K_2TiF_6$. The product displayed red fluorescence when excited with UV or blue light, demonstrating formation of a phosphor represented as $K_2TiF_6$:Mn.

Figure 4:
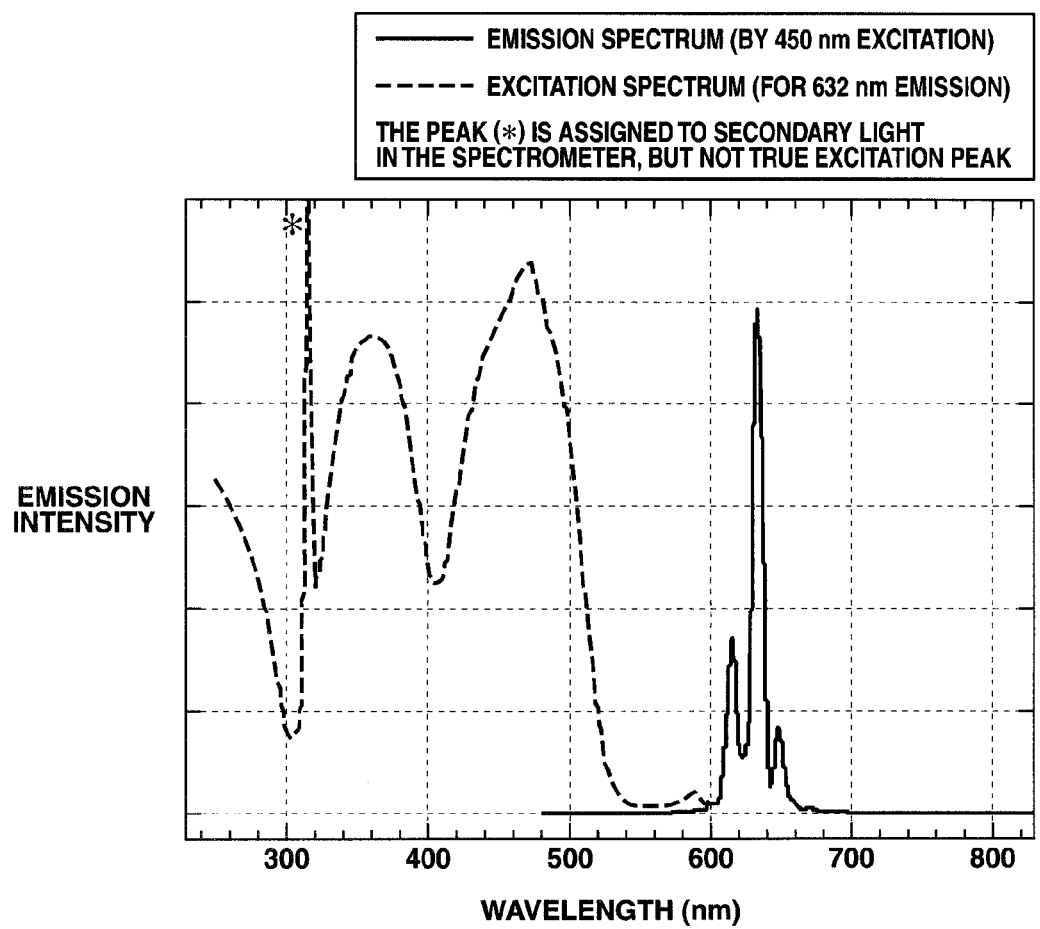
FIG. 4 diagrammatically illustrates emission and excitation spectra of the phosphor obtained in Example 4.

As in Example 1, emission and excitation spectra of the phosphor were measured, with the results shown in FIG. 4.

As in Example 1, the phosphor was measured for absorptance and quantum efficiency at excitation wavelength 450 nm, finding an absorptance of 0.701, an internal quantum efficiency of 0.320 and an external quantum efficiency of 0.224. The results are also tabulated in Table 1.

Figure 5:
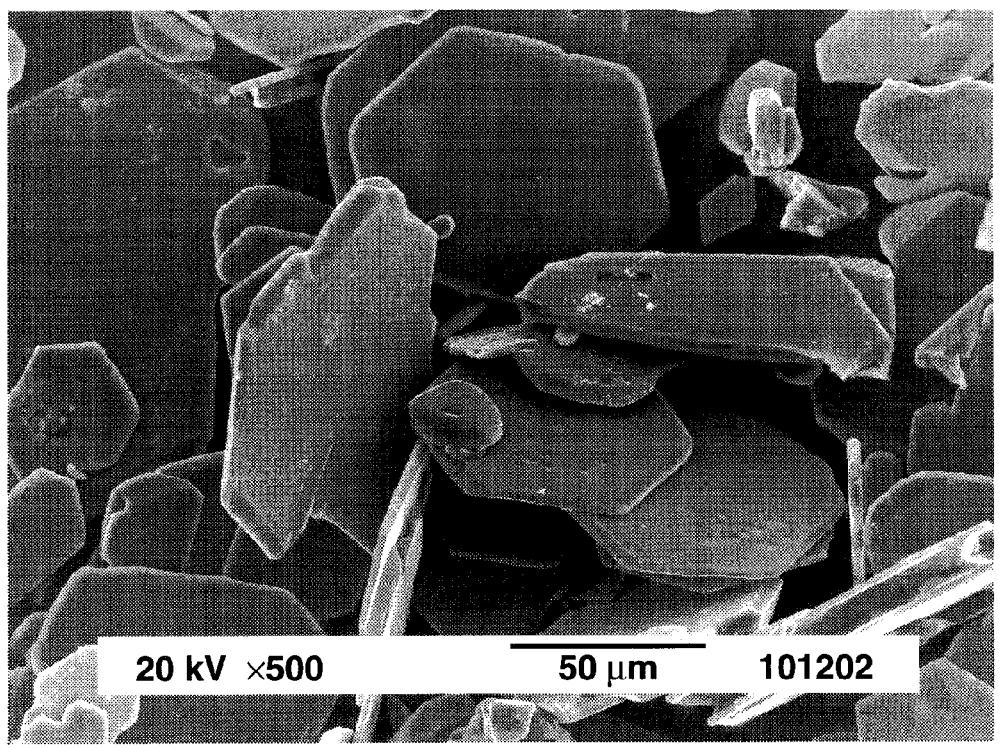
FIG. 5 is a SEM micrograph of the phosphor in Example 4.

The phosphor was observed under SEM. It is seen from the SEM micrograph of FIG. 5 that the phosphor is composed mainly of platy particles having a relatively uniform size in the range of about 50 to 70 μm.

Example 5

An aqueous solution of silicon fluoride was prepared by dissolving 4.8 g of silicon dioxide in 100 cm$^3$ of 48 wt % hydrofluoric acid aqueous solution and allowing the solution to cool down to room temperature. The $K_2MnF_6$ powder (1.19 g) in Preparation Example 1 was added to the aqueous solution of silicon fluoride and dissolved therein by stirring, obtaining an aqueous solution containing silicon fluoride and $K_2MnF_5$ as a first solution. With stirring, 24.27 g of solid potassium nitrate ($KNO_3$) was added little by little to the first solution whereupon a pale orange solid precipitated. Stirring was continued for further 5 minutes. The solid product was filtered, washed with a small volume of 20 wt % hydrofluoric acid aqueous solution and then ethanol, and dried in vacuum, obtaining 17.61 g of the reaction product.

On powder x-ray diffractometry, the product was identified to have a crystalline structure corresponding to $K_2SiF_6$. The product displayed red fluorescence when excited with UV or blue light, demonstrating formation of a phosphor represented as $K_2SiF_6$:Mn.

As in Example 1, emission and excitation spectra of the phosphor were measured, obtaining the spectra equivalent to those of Example 1. Also as in Example 1, the phosphor was measured for absorptance and quantum efficiency at excitation wavelength 450 nm, finding an absorptance of 0.499, an internal quantum efficiency of 0.555 and an external quantum efficiency of 0.277. The results are also tabulated in Table 1.

A SEM image of the phosphor was observed. The phosphor was composed mainly of angular particles having a size of about 10 μm.

Example 6

Using the same raw materials and the same procedure as in Example 5, an aqueous solution containing silicon fluoride and $K_2MnF_6$ was prepared as a first solution. Separately, an aqueous solution containing potassium was prepared as a second solution by dissolving 13.46 g of potassium hydroxide (KOH) in 30 cm$^3$ of water. With stirring, the second solution was slowly added to the first solution over about 1 minute. Stirring was continued for some time whereupon a pale orange solid precipitated. The solid product was filtered, washed with a small volume of 20 wt % hydrofluoric acid aqueous solution and then ethanol, and dried in vacuum, obtaining 16.72 g of the reaction product.

On powder x-ray diffractometry, the product was identified to have a crystalline structure corresponding to $K_2SiF_6$. The product displayed red fluorescence when excited with UV or blue light, demonstrating formation of a phosphor represented as $K_2SiF_6$:Mn.

As in Example 1, emission and excitation spectra of the phosphor were measured, obtaining the spectra equivalent to those of Example 1. Also as in Example 1, the phosphor was measured for absorptance and quantum efficiency at excitation wavelength 450 nm, finding an absorptance of 0.494, an internal quantum efficiency of 0.493 and an external quantum efficiency of 0.243. The results are also tabulated in Table 1.

A SEM image of the phosphor was observed. The phosphor was composed mainly of angular particles having a size of about 10 μm.

Example 7

Using the same reactants and the same procedure as in Example 5, an aqueous solution containing silicon fluoride and $K_2MnF_6$ was prepared as a first solution. With stirring, 17.04 g of solid sodium sulfate ($Na_2SO_4$) was added little by little to the first solution whereupon a pale orange solid precipitated. Stirring was continued for further 5 minutes. The solid product was filtered, washed with a small volume of 20 wt % hydrofluoric acid aqueous solution and then ethanol, and dried in vacuum, obtaining 15.17 g of the reaction product.

On powder x-ray diffractometry, the product was identified to have a crystalline structure corresponding to $Na_2SiF_6$. The product displayed red fluorescence when excited with UV or blue light, demonstrating formation of a phosphor represented as $Na_2SiF_6$:Mn.

Figure 6:
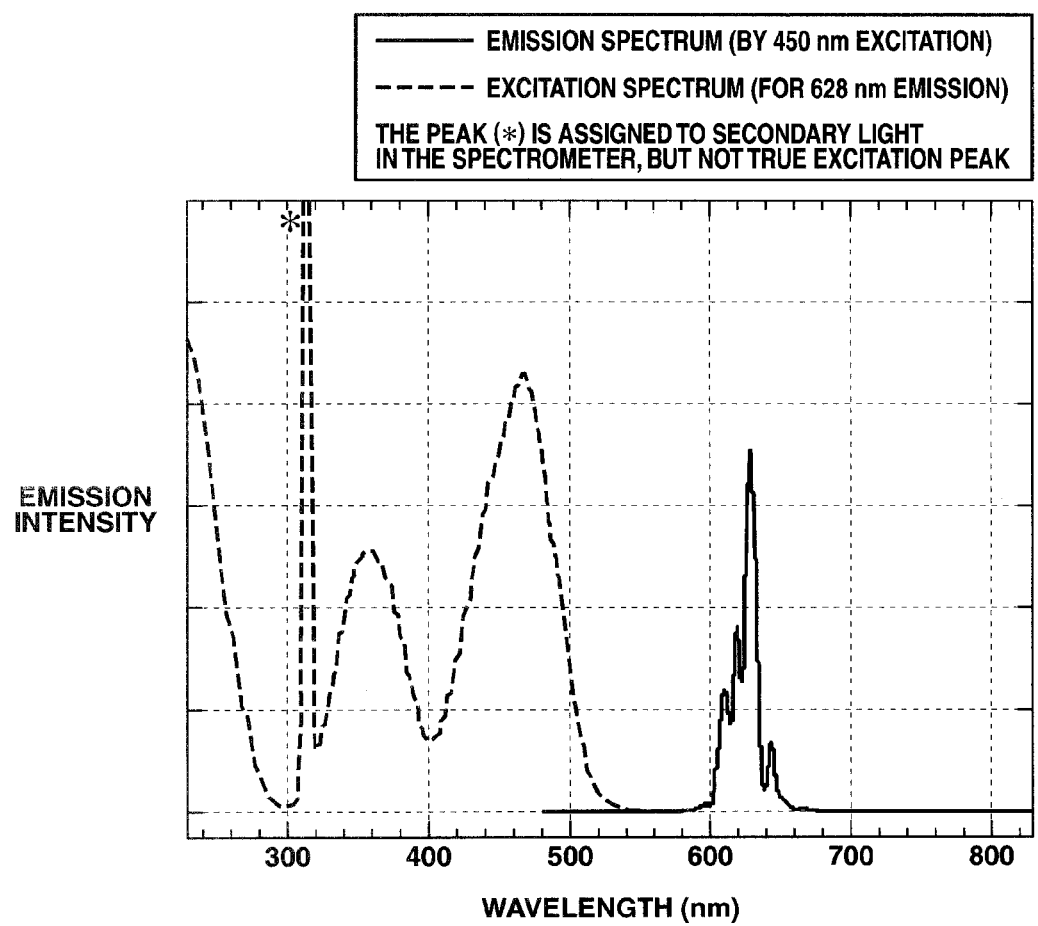
FIG. 6 diagrammatically illustrates emission and excitation spectra of the phosphor obtained in Example 7.

As in Example 1, emission and excitation spectra of the phosphor were measured, with the results shown in FIG. 6. Also as in Example 1, the phosphor was measured for absorptance and quantum efficiency at excitation wavelength 450 nm, finding an absorptance of 0.431, an internal quantum efficiency of 0.675 and an external quantum efficiency of 0.291. The results are also tabulated in Table 1.

A SEM image of the phosphor was observed. The phosphor was composed mainly of angular particles having a size of about 10 to 20 μm.

Example 8

Using the same reactants and the same procedure as in Example 5, an aqueous solution containing silicon fluoride and $K_2MnF_6$ was prepared as a first solution. With stirring, 12.72 g of solid sodium carbonate ($Na_2CO_3$) was added little by little to the first solution over about 2 minutes while taking care so as to avoid foaming. A pale orange solid precipitated and the temperature rose to about 50° C. due to exotherm. Stirring was continued for further 5 minutes. The solid product was filtered, washed with a small volume of 20 wt % hydrofluoric acid aqueous solution and then ethanol, and dried in vacuum, obtaining 15.02 g of the reaction product.

On powder x-ray diffractometry, the product was identified to have a crystalline structure corresponding to $Na_2SiF_6$. The product displayed red fluorescence when excited with UV or blue light, demonstrating formation of a phosphor represented as $Na_2SiF_6$:Mn.

As in Example 1, emission and excitation spectra of the phosphor were measured, obtaining the spectra equivalent to those of Example 7. Also as in Example 1, the phosphor was measured for absorptance and quantum efficiency at excitation wavelength 450 nm, finding an absorptance of 0.243, an internal quantum efficiency of 0.650 and an external quantum efficiency of 0.158. The results are also tabulated in Table 1.

A SEM image of the phosphor was observed. The phosphor was composed mainly of angular particles having a size of about 10 to 20 μm.

Comparative Example 1

In a fluororesin-lined container, 40.0 g of titanium dioxide was added to 100 cm$^3$ of 48 wt % hydrofluoric acid aqueous solution and 50 cm$^3$ of water and dissolved therein by heating at 95° C. for 10 hours. A solution of 56.1 g of potassium hydroxide in 100 cm³ of water was added to the resulting aqueous solution whereupon a solid product formed. The solid product was filtered and dried. On powder x-ray diffractometry, the product was found to have the crystalline structure of $K_2TiF_6$. That is, the formation of $K_2TiF_6$ was confirmed.

Next, 15.43 g of the $K_2TiF_6$ and 1.27 g of the $K_2MnF_6$ powder in Preparation Example 1 were added to 135 cm³ of 48 wt % hydrofluoric acid aqueous solution and 27 cm³ of water and dissolved therein to form an orange aqueous solution. The solution was transferred to a fluororesin evaporating dish, which was placed in a draft furnace and heated in a water bath for concentrating the solution. On heating for 5 hours, the solution turned dark reddish brown color. Heating was stopped when the liquid surface became faintly cloudy. The solution was allowed to cool overnight whereupon pale yellow crystals precipitated. The solid product was filtered, washed with a small volume of 20 wt % hydrofluoric acid aqueous solution and then ethanol, and dried in vacuum, obtaining 9.75 g of the reaction product.

On powder x-ray diffractometry, the product was identified to have a crystalline structure corresponding to $K_2TiF_6$. The product displayed red fluorescence when excited with UV or blue light, demonstrating formation of a phosphor represented as $K_2TiF_6$:Mn.

As in Example 1, emission and excitation spectra of the phosphor were measured, obtaining the spectra of analogous profiles to those of Example 4. Also as in Example 1, the phosphor was measured for absorptance and quantum efficiency at excitation wavelength 450 nm, finding an absorptance of 0.828, an internal quantum efficiency of 0.254 and an external quantum efficiency of 0.210. The results are also tabulated in Table 1.

Figure 7:
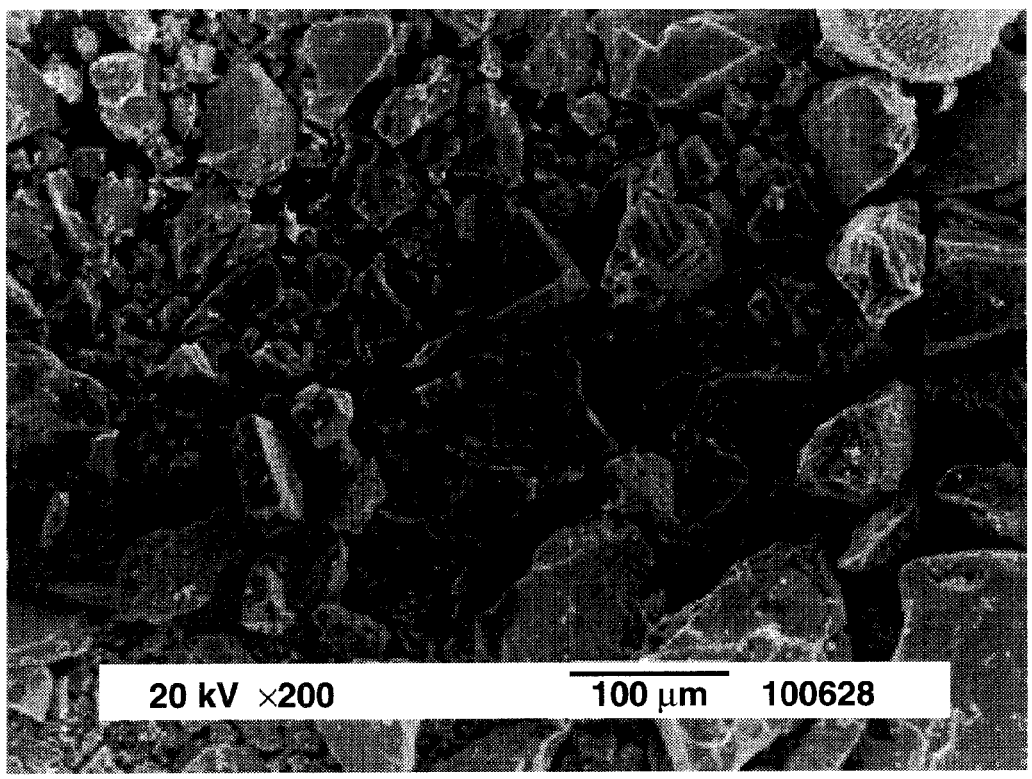
FIG. 7 is a SEM micrograph of the phosphor in Comparative Example 1.

The phosphor was observed under SEM. It is seen from the SEM micrograph of FIG. 7 that the phosphor was composed of irregular particles including fine particles of about 1 µm to coarse particles of more than 100 µm.

Comparative Example 2

Potassium hydroxide, 11.8 g, was added to 45.9 g of 33 wt % hexafluorosilicic acid aqueous solution. The liquid was white turbid at this point, but became a clear aqueous solution when 200 cm³ of 48 wt % hydrofluoric acid aqueous solution and 40 cm³ of water were added thereto.

The $K_2MnF_6$ powder (1.27 g) in Preparation Example 1 was added to the aqueous solution and dissolved therein to form an orange aqueous solution. This aqueous solution was heated and concentrated as in Comparative Example 1. Heating was stopped when the liquid surface became faintly cloudy. The solution was allowed to cool overnight whereupon pale yellow crystals precipitated. The solid product was filtered, washed with a small volume of 20 wt % hydrofluoric acid aqueous solution and then ethanol, and dried in vacuum, obtaining 19.32 g of the reaction product.

On powder x-ray diffractometry, the product was identified to have a crystalline structure corresponding to $K_2SiF_6$. The product displayed red fluorescence when excited with UV or blue light, demonstrating formation of a phosphor represented as $K_2SiF_6$:Mn.

As in Example 1, emission and excitation spectra of the phosphor were measured, obtaining the spectra of analogous profiles to those of Example 1. Also as in Example 1, the phosphor was measured for absorptance and quantum efficiency at excitation wavelength 450 nm, finding an absorptance of 0.300, an internal quantum efficiency of 0.450 and an external quantum efficiency of 0.135. The results are also tabulated in Table 1.

Figure 8:
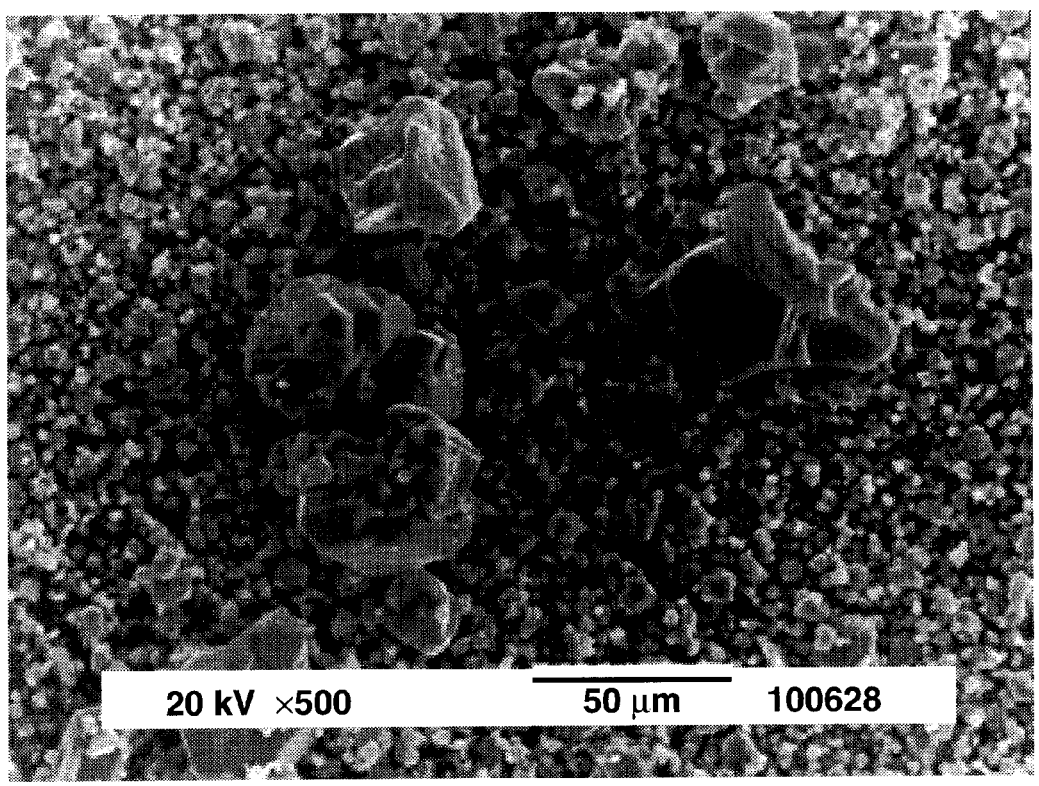
FIG. 8 is a SEM micrograph of the phosphor in Comparative Example 2.

The phosphor was observed under SEM. It is seen from the SEM micrograph of FIG. 8 that the phosphor was composed of irregular particles including fine particles of about 1 µm to coarse particles of about 50 µm.

Comparative Example 3

A first solution was prepared as in Example 2. By the same procedure as in Example 2 except that 17.8 g of potassium chloride was used instead of potassium fluoride, an aqueous solution of potassium chloride was prepared as a second solution. With stirring, the second solution was added little by little to the first solution. As the second solution was added, the liquid changed its color from reddish brown to dark red, and finally, substantially white solids formed. The solid product was filtered, washed with a small volume of 20 wt % hydrofluoric acid aqueous solution and then ethanol, and dried in vacuum, obtaining 16.12 g of the reaction product.

On powder x-ray diffractometry, the product was identified to have a crystalline structure corresponding to $K_2SiF_6$. The product displayed substantially no fluorescence when excited with UV or blue light. It was analyzed for Mn by an electron beam microanalyzer, finding an extremely low content of Mn.

TABLE 1

| | Absorptance | Internal quantum efficiency | External quantum efficiency |
|---|---|---|---|
| | Excitation wavelength 450 nm | | |
| Example 1 | 0.701 | 0.717 | 0.503 |
| Example 2 | 0.471 | 0.451 | 0.212 |
| Example 3 | 0.716 | 0.801 | 0.574 |
| Example 4 | 0.701 | 0.320 | 0.224 |
| Example 5 | 0.499 | 0.555 | 0.277 |
| Example 6 | 0.494 | 0.493 | 0.243 |
| Example 7 | 0.431 | 0.675 | 0.291 |
| Example 8 | 0.243 | 0.650 | 0.158 |
| Comparative Example 1 | 0.828 | 0.254 | 0.210 |
| Comparative Example 2 | 0.300 | 0.450 | 0.135 |
| Comparative Example 3 | substantially no fluorescence | | |

Japanese Patent Application No. 2011-086353 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a complex fluoride having the formula (1):

$$A_2MF_6 \quad (1)$$

wherein M is at least one tetravalent element selected from the group consisting of Si, Ti, Hf, Ge, and Sn, A is at least one alkali metal selected from the group consisting of Li, Na, K, Rb, and Cs, said method comprising the steps of:
providing a first solution containing a fluoride of tetravalent element M, hydrogenfluoride, and water,
providing a second solution containing a compound of alkali metal A and/or the compound of alkali metal A in solid form, the compound of alkali metal A being selected from the group consisting of a fluoride, hydrogenfluoride, nitrate, sulfate, hydrogensulfate, carbonate, hydrogencarbonate, and hydroxide, mixing the first solution with the second solution and/or the solid for reacting the fluoride of tetravalent element M with the compound of alkali metal A to form a solid product, and recovering the solid product via solid-liquid separation.

2. The method of claim 1 wherein the tetravalent element M is Si and/or Ti, and the alkali metal A is Na and/or K.

3. The method of claim 1, wherein the concentration of the fluoride of tetravalent element M is 0.1 to 3 mol/liter.

4. A method for preparing a complex fluoride phosphor having the formula (2):

$$A^1_2MF_6:Mn \quad (2)$$

wherein M is at least one tetravalent element selected from the group consisting of Si, Ti, Zr, Hf, Ge, and Sn, $A^1$ is at least one alkali metal selected from the group consisting of Li, Na, K, Rb, and Cs, and invariably contains Na and/or K, said method comprising the steps of:

providing a first solution containing a fluoride of tetravalent element M, providing a second solution containing a compound of alkali metal A and/or the compound of alkali metal A in solid form, wherein A is at least one alkali metal selected from the group consisting of Li, Na, K, Rb, and Cs, the compound of alkali metal A being selected from the group consisting of a fluoride, hydrogenfluoride, nitrate, sulfate, hydrogensulfate, carbonate, hydrogencarbonate, and hydroxide, adding at least one of manganese compounds, $Na_2MnF_6$ and $K_2MnF_6$ to at least one of the first solution and the second solution and/or the solid, mixing the first solution with the second solution and/or the solid for reacting the fluoride of tetravalent element M with the compound of alkali metal A and the manganese compound to form a solid product, and recovering the solid product via solid-liquid separation.

5. The method of claim 4 wherein the tetravalent element M is Si and/or Ti, the alkali metal $A^1$ is Na and/or K, and the alkali metal A is Na and/or K.

6. The method of claim 4 wherein the second solution and the solid are a solution containing an alkali fluoride AF and the alkali fluoride AF in solid form, respectively, wherein A is as defined above.

7. The method of claim 4 wherein the second solution and the solid are a solution containing an alkali fluoride AF and the alkali fluoride AF in solid form, respectively, wherein A is as defined above.

8. A method for preparing a complex fluoride having the formula (1):

$$A_2MF_6 \quad (1)$$

wherein M is at least one tetravalent element selected from the group consisting of Si, Ti, Zr, Hf, Ge, and Sn, A is at least one alkali metal selected from the group consisting of Li, K, Rb, and Cs, said method comprising the steps of:

providing a first solution containing a fluoride of tetravalent element M, hydrogenfluoride, and water, providing a second solution containing a compound of alkali metal A and/or the compound of alkali metal A in solid form, the compound of alkali metal A being selected from the group consisting of a fluoride, hydrogenfluoride, nitrate, sulfate, hydrogensulfate, carbonate, hydrogencarbonate, and hydroxide, mixing the first solution with the second solution and/or the solid for reacting the fluoride of tetravalent element M with the compound of alkali metal A to form a solid product, and recovering the solid product via solid-liquid separation.

9. The method of claim 8, wherein the concentration of the fluoride of tetravalent element M is 0.1 to 3 mol/liter.

10. A method for preparing a complex fluoride having the formula (1):

$$A_2MF_6 \quad (1)$$

wherein M is at least one tetravalent element selected from the group consisting of Si, Ti, Zr, Hf, Ge, and Sn, A is at least one alkali metal selected from the group consisting of Li, Na, K, Rb, and Cs, said method comprising the steps of;

providing a first solution containing a fluoride of tetravalent element M, hydrogenfluoride, and water, wherein the concentration of the fluoride of tetravalent element M is 0.1 to 3 mol/liter, providing a second solution containing a compound of alkali metal A and/or the compound of alkali metal A in solid form, the compound of alkali metal A being selected from the group consisting of a fluoride, hydrogenfluoride, nitrate, sulfate, hydrogensulfate, carbonate, hydrogencarbonate, and hydroxide, mixing the first solution with the second solution and/or the solid for reacting the fluoride of tetravalent element M with the compound of alkali metal A to form a solid product, and recovering the solid product via solid-liquid separation.

11. The method of claim 10, wherein the tetravalent element M is Si and/or Ti, and the alkali metal A is Na and/or K.

* * * * *